（12）United States Patent
Komiyama (10) Patent No.: US 10,491,395 B2
(45) Date of Patent: Nov. 26, 2019

(54) HANDY TERMINAL AND PAYMENT METHOD TO BE USED IN SAME (75) Inventor: Tsuyoshi Komiyama, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 1340 days.

(21) Appl. No.: 13/496,159

(22) PCT Filed: Nov. 5, 2010

(86) PCT No.: PCT/JP2010/069754
§ 371 (c)(1),
(2), (4) Date: Mar. 14, 2012

(87) PCT Pub. No.: WO2011/055804
PCT Pub. Date: May 12, 2011

(65) Prior Publication Data
US 2012/0173435 A1   Jul. 5, 2012

(30) Foreign Application Priority Data

Nov. 9, 2009   (JP) ................................ 2009-256218

(51) Int. Cl.
*G06Q 20/32*   (2012.01)
*G06Q 20/36*   (2012.01)
(Continued)

(52) U.S. Cl.
CPC ............ *H04L 9/3236* (2013.01); *G06F 21/34* (2013.01); *G06Q 20/32* (2013.01);
(Continued)

(58) Field of Classification Search
CPC .... G06Q 10/10; G06Q 20/28; G06Q 540/025; G06Q 30/0267; G06Q 30/0277;
(Continued)

(56) References Cited

U.S. PATENT DOCUMENTS 5,191,608 A   3/1993  Geronimi
6,956,950 B2 * 10/2005  Kausik ................ G06F 21/6245
380/277
(Continued)

FOREIGN PATENT DOCUMENTS

CN   1672180 A   9/2005
GB   2445231 A   7/2008
(Continued)

OTHER PUBLICATIONS

Chinese Office Action dated May 6, 2013 in corresponding Chinese Patent Application No. 2010800411070.
(Continued)

*Primary Examiner* — Johann Y Choo
(74) *Attorney, Agent, or Firm* — Sughrue Mion, PLLC (57) ABSTRACT

There is provided a handy terminal in which inputting of an application program and of a PIN is executed and a keyboard and a display device are commonly used thus security is secured with a simple system. A card reader control program 23*b* in the keyboard unit memory 23 detects an insertion state of a credit card and notifies a detected key code from the keyboard control program 23*a* to a payment program on the main board 2. A main CPU 12 calculates a program hash value provided to the payment program and a program hash value at the time of execution of a payment program 11*b* and encrypts and decrypts these hash values using a secret key, encrypted key, and public key so that these hash values are not stolen. The main CPU 12 compares the program hash value provided to the payment program 11*b* with the program hash value to be used at the time of the execution of the payment program 11*b*.

20 Claims, 4 Drawing Sheets (51) Int. Cl.
  *G06Q 20/38* (2012.01)
  *G06Q 20/40* (2012.01)
  *H04L 9/32* (2006.01)
  *G07F 7/10* (2006.01)
  *G07F 7/12* (2006.01)
  *G06F 21/34* (2013.01)

(52) U.S. Cl.
  CPC ..... *G06Q 20/3674* (2013.01); *G06Q 20/3827* (2013.01); *G06Q 20/40* (2013.01); *G07F 7/1091* (2013.01); *G07F 7/122* (2013.01); *H04L 9/3226* (2013.01); *H04L 2209/56* (2013.01); *H04L 2209/805* (2013.01)

(58) Field of Classification Search
  CPC ............ G06Q 30/0251; G06Q 10/1053; G06F 17/30241; G06F 3/0482; G06F 15/76
  USPC .......................................................... 705/67
  See application file for complete search history.

(56) References Cited

U.S. PATENT DOCUMENTS

| | | | |
|---|---|---|---|
| 7,110,984 B1* | 9/2006 | Spagna | G06F 21/10 380/201 |
| 2001/0008012 A1* | 7/2001 | Kausik | G06F 21/6245 713/156 |
| 2003/0004877 A1* | 1/2003 | Kasasaku | G06Q 20/105 705/41 |
| 2005/0076210 A1* | 4/2005 | Thomas | H04L 9/0866 713/165 |
| 2005/0145690 A1* | 7/2005 | Shibasaki | G06F 21/34 235/379 |
| 2006/0020821 A1* | 1/2006 | Waltermann | G06F 21/57 713/189 |
| 2007/0098179 A1* | 5/2007 | Nave | G11B 20/00086 380/286 |
| 2008/0041933 A1 | 2/2008 | Shibasaki | |
| 2009/0069049 A1* | 3/2009 | Jain | G06K 19/07739 455/558 |

FOREIGN PATENT DOCUMENTS

| | | |
|---|---|---|
| JP | 2002-133533 A | 5/2002 |
| JP | 2003-016527 A | 1/2003 |
| JP | 2003-162758 A | 6/2003 |
| JP | 2005-182315 A | 7/2005 |
| JP | 2006-178544 A | 7/2006 |
| JP | 2009-187501 A | 8/2009 |
| WO | 9961989 A1 | 12/1999 |
| WO | WO 2004/017255 A1 | 2/2004 |

OTHER PUBLICATIONS

Communication dated Jul. 12, 2016, issued by the European Patent Office in corresponding European Application No. 10828363.1.

* cited by examiner

HANDY TERMINAL AND PAYMENT METHOD TO BE USED IN SAME

CROSS REFERENCE TO RELATED APPLICATIONS

This application is a National Stage of International Application No. PCT/JP2010/069754 filed Nov. 5, 2010, claiming priority based on Japanese Patent Application No. 2009-256218, filed Nov. 9, 2009, the contents of all of which are incorporated herein by reference in their entirety.

TECHNICAL FIELD

The present invention relates to a handy terminal and a payment method to be used in the handy terminal and more particularly to the handy terminal and the payment method suitably used in a portable information terminal having a payment capability to make a settlement for a credit card.

BACKGROUND TECHNOLOGY

For a handy terminal to perform a process by inputting a PIN (Personal Identification Number) of a credit card, PCIDSS (Payment Card Industry Data Security Standard) being an international uniform standard for security of a payment card is regulated. According to the international uniform standard, by providing a handy terminal with a keyboard for dedicated use for inputting of a PIN and a display device, stealing of a PIN code can be prevented. That is, when a PIN of a credit card is inputted, in addition to a keyboard to be used in the application program, by providing a keyboard for dedicated use, inputting of the PIN is executed. Moreover, a display device for an application program is separated from a display device to be used in inputting of the PIN. Thus, in the execution of inputting of a PIN and of the application program by operating the keyboard and display device in a separated manner, the PIN code can be also prevented from being stolen.

As a related technology of this kind, there is an order payment system disclosed in Patent Reference 1. By using the order payment system, for example, at a restaurant and a like, by cooperating a POS (Point of Sales) with a handy terminal at a seat, without operations at the POS, a payment process of a credit card while at the seat can be performed.

In the payment device disclosed in Patent Reference 2, an IC card and PDA (Personal Digital Assistance) device are so constructed to be operated in a cooperated manner and customer information A is, in advance, registered with a payment server. When a PIN inputted by a customer into the PDA is aligned with a PIN of the IC card, customer information B is transmitted to from the PDA to the payment server. Then, when the customer information B transmitted from the PDA to the payment server is aligned with the customer information A registered with the payment server, an instruction for payment of the IC card is provided from the payment server to the PDA. By these operations, the prevention of stealing customer's information and the settlement of a credit card can be simultaneously realized.

Moreover, in a data processing device disclosed in Patent Reference 3, in a multi CPU system made up of a main CPU board and a sub CPU board, only when the sub CPU board performs authentication by using a certified secret key and a running program, the process of payment is performed by the main CPU board. Thus, by separating the sub CPU board for certification from the main CPU board for execution of the payment processing, the settlement process of a card can be performed while preventing the steal of customer information.

RELATED ART DOCUMENT

Related Art Patent References

Related Art Patent Reference 1: Japanese Patent Application Laid-open No. 2002-133533.
Related Art Patent Reference 2: Japanese Patent Application Laid-Open No. 2005-182315.
Related Art Patent Reference 3: Japanese Patent Application Laid-Open No. 2006-178544.

SUMMARY OF INVENTION

Problems to be Solved by the Invention

However, in the case of the technologies disclosed in the above Related Art Patent References have the following problems: That is, if one portable information terminal is used as a dedicated device for inputting a PIN, in addition to this device, another portable information terminal for an application program must be prepared and, as a result, two portable information terminals must be also prepared, which causes portability to b lost. Moreover, if two keyboards for an application program and for inputting a PIN, two keyboards and two display device have to be mounted in one portable information terminal, thus inevitably causing an increase in manufacturing costs and further, its applications are also limited, which becomes a factor distributing the development of products of the portable information terminal.

Then, if the keyboard to be used in an application program and display device can be commonly used in the putting of a PIN, one portable information terminal can be made small-sized. In other words, an application program and a program for inputting a PIN can share the keyboard and display device, which enables a plat form for software and hardware being an environment to be commonly used, as a result, it is made possible to miniaturize a device for a portable information terminal and to achieve effectively device development of products in the portable information terminal. This enables improvement of portability of a portable information terminal, simplification of manufacturing design and manufacturing costs, reduction of product costs, and improvement of convenience of a portable information terminal for users. However, there is a problem that, by commonly using a keyboard for an application program and a program for inputting a PIN and a display device, when a spurious screen program is installed, a pseudo screen for inputting a PIN, which causes a PIN cord to be stolen.

Moreover, the order settlement system disclosed in the Patent Reference 1 is designed for performing the settlement by cooperation between the handy terminal for dedicated use of the settlement and a POS and, as a result, the handy terminal system cannot solely performs the settlement processes. This handy terminal is used not for development of an application program but for only payment process for a credit card. Therefore, by using this technology, it is impossible to realize a handy terminal capable of using commonly a keyboard for the application program and a program for inputting a PIN cord and a display device.

In the payment system disclosed in the Patent Reference 2, the PDA is designed to perform the settlement process while preventing stealing of a PIN cod by cooperation with the settlement server and, therefore, the settlement process system becomes complicated accordingly. In addition, the PDA is not provided with a function of performing the settlement process while solely preventing stealing of a PIN and, therefore, as in the case of the Patent Reference 1, it is impossible to achieve the technology to commonly use a keyboard for an application program and a program for inputting a PIN, and display device.

Also, in the data processing device disclosed in the Patent Reference 3, it is made possible to perform settlement processing while preventing stealing of a PIN code by cooperation between the main CPU board and the sub CPU board, however, the payment processing system becomes complicated. Therefore, by using the technology, it is impossible to expand the technology so that the main CPU board or sub CPU board can solely prevent the stealing of a PIN code while performing the settlement processing at the same time.

In view of the above, an object of the present invention is to provide a handy terminal and a payment method to be used in the handy terminal to have a settlement function of ensuring security with a simple system even when a keyboard for inputting of an application program and inputting of a PIN and a display device are commonly used.

Means for Solving the Problems

In order to solve the above problems, according to a first feature configuration of the present invention, there is provided a handy terminal having a payment capability in which inputting of an application program and inputting of a PIN of a credit card which is controlled by a payment program is able to be processed by a common keyboard, the handy terminal including a payment program legitimateness judging unit to judge whether or not the payment program, inputting of which is required, is legitimately released when an inserted state of a credit card is detected, by using a program hash value of the payment program.

According to a second feature configuration of the present invention, there is provided a payment method to be used in a handy terminal in which, inputting of an application program and inputting of a PIN of a credit card which is controlled by a payment program is able to be processed by a common keyboard, the payment method including a first step of detecting a state of insertion of the credit card and a second step of judging, when a state of insertion of the credit card in the first step, using a program hash value of the payment program, whether or not the payment program, inputting of which is requested, is legitimately released.

Effects of Invention

According to the present invention, even when a keyboard for an application program, a program for inputting a PIN, and a display device are commonly used by making, in advance, a designated program certification to conform legitimateness of a payment program, stealing of the PIN code of a credit card can be prevented. When a state of inserting of a credit card is detected, notification of the inputting of the PIN is made only to the certified program. Moreover, in a state where the credit card has been extracted, an existing application program can be operated as a general-use keyboard, which enables the versatility of a designated level to be obtained.

BEST MODE OF CARRYING OUT THE INVENTION

A handy terminal is realized which includes a detecting means to detect a state of inserting and extracting of a credit card, a hash value calculating means to calculate a first program hash value provided to a payment program and a second hash program used at time of the execution of the program, which are used to detect alteration of the payment program, an encryption means to encrypt the first program hash value and the second program hash value calculated by the hash value calculating means, a decryption means to decrypt, by using a first key, the first program hash value and the second program hash value encrypted by the encryption means, a hash value comparing means to compare the first program hash value with the second program hash value to judge whether or not the payment program is legitimately released, and a key code notification controlling means to control the notification of a key code based on an inserting and extracting state of the above credit card detected by the detecting means when results obtained by the hash value comparing means are aligned with one another.

When the payment program legitimateness judging means judges that the payment program is legitimate, the execution of inputting of a PIN code of the above credit card is enabled and, when the payment program legitimateness judging means judges that the payment program is illegitimate, the notification of a key code is rejected and the execution of inputting of the PIN code is disabled. When the hash value comparing means judges that the first program hash value is aligned with the second program hash value, the above key code notification controlling mean enables the execution of inputting the PIN code of a credit card and when the hash value comparing means judges that the first program hash value is not aligned with the second program hash value, the key code notification controlling means rejects the notification of the key code and disables the execution of inputting the PIN code.

The handy terminal also has a coupling means to couple an encrypted first program hash value to the payment program which installs the encrypted first program hash value and the payment program as a coupled module in a main board memory. Moreover, the above first key is an encrypted key produced by using a secret key and a random number and the second key is the encrypted key and public key and the first program hash key and second program hash key are encrypted by using at least one of the secret key and encrypted key and the encrypted first program hash value and second hash value are decrypted by using the public key or the encrypted key.

First Embodiment

Figure 1:
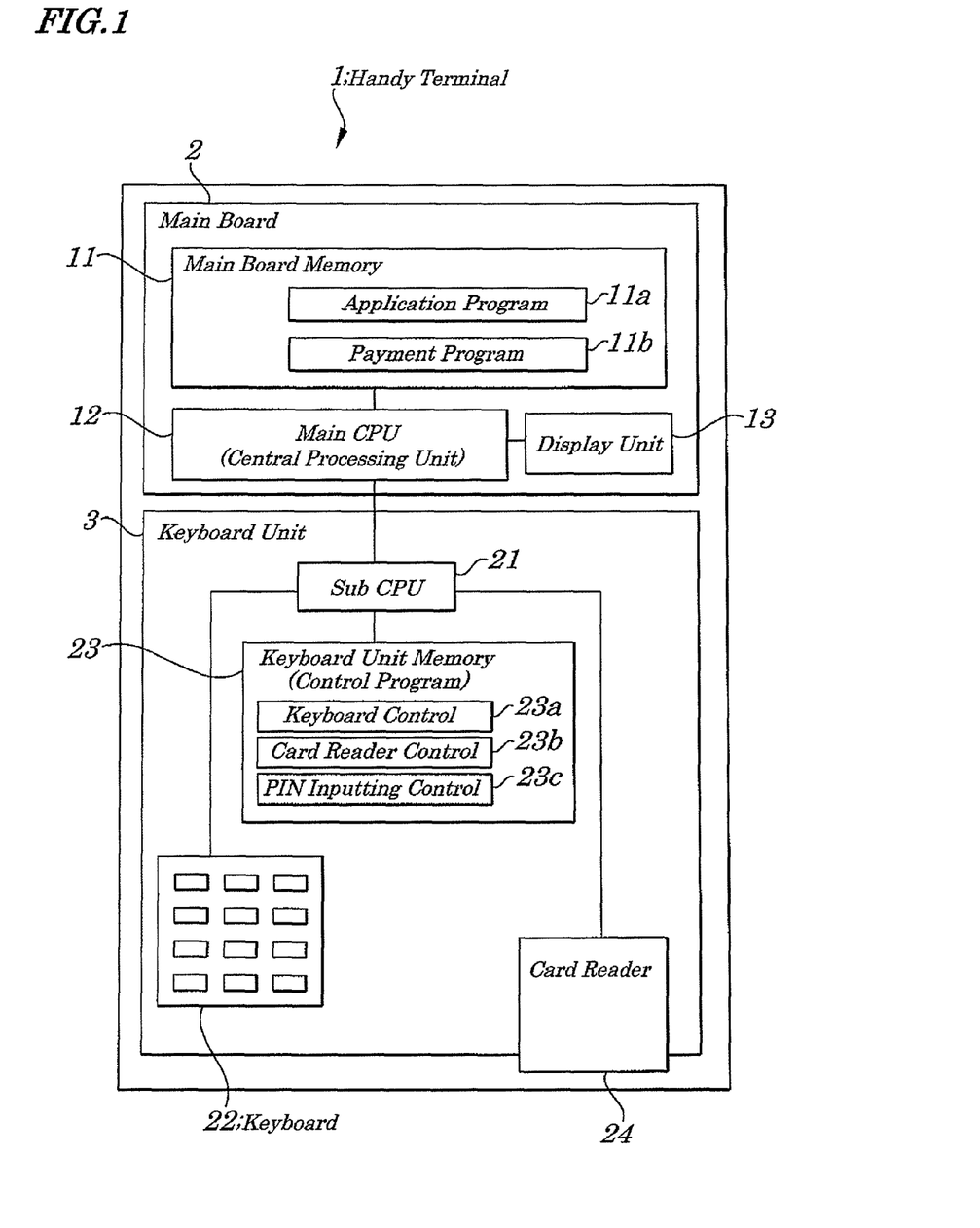
FIG. 1 is a black diagram showing configurations of a handy terminal according to one embodiment of the present invention.

Hereinafter, by referring to drawings, embodiments of the handy terminal of a payment capability providing type of the present invention are described in detail. FIG. 1 is a block diagram showing configurations of a handy terminal of the first embodiment of the present invention. As shown in FIG. 1, the handy terminal 1 is made up of a main board 2 and a keyboard unit 3. The main board 2 includes a main board memory 11 to execute programs (application program 11a and payment program 11b) on the main board 2, a main CPU (Central Processing Unit) 12 to perform processing on entire operations of the handy terminal 1, and a display unit 13 to display contents of the application program 11a and payment program 11b and/or contents inputted from outside.

The keyboard unit 3 includes a sub CPU 21 to run various kinds of programs mounted on the keyboard unit 3, a keyboard 22 serving as a user interface to input data for various operations, a keyboard unit memory 23 to execute various control programs (keyboard control program 23a, card reader control program 23b, and PIN inputting control program 23c) installed in the keyboard unit 3, and a card reader 24 to read information stored in a credit card.

Figure 2:
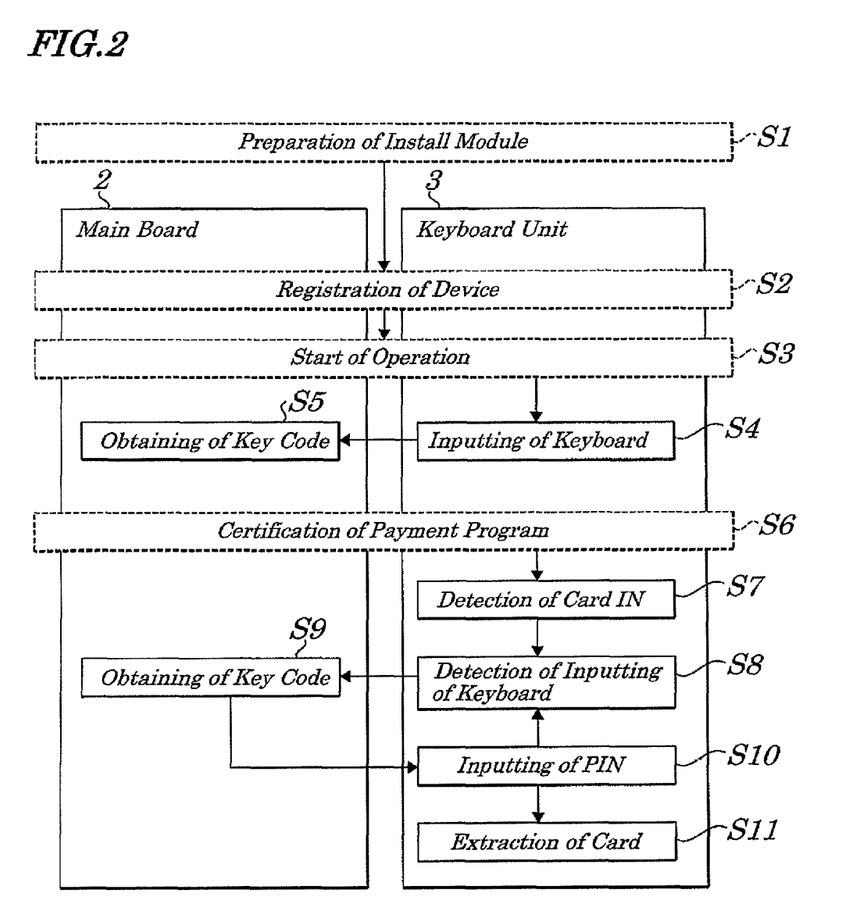
FIG. 2 is a flow chart showing a flow of operations of the handy terminal of FIG. 1.
Figure 3:
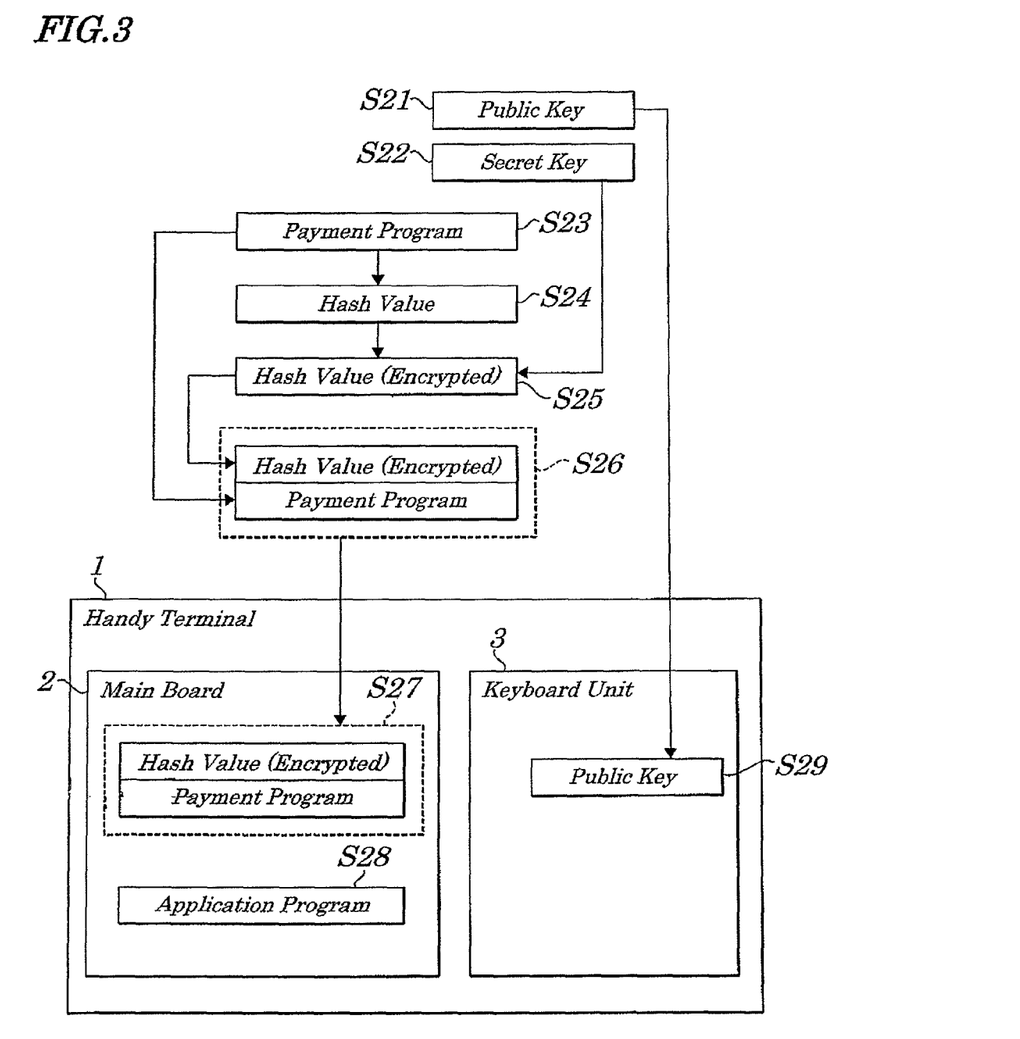
FIG. 3 is a flow chart showing a flow of the preparation for installing a module in Steps S1 and S2 of FIG. 2.
Figure 4:
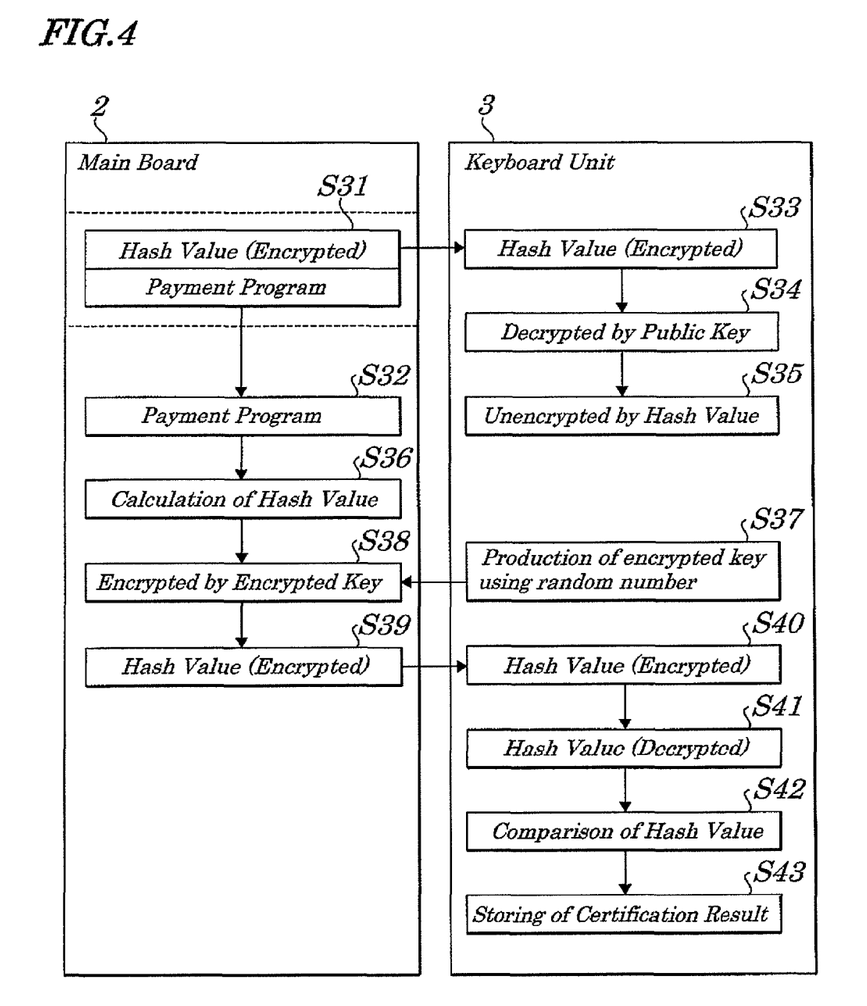
FIG. 4 is a flow chart showing a flow of a certification process of a payment program 11b in the Step S6 of FIG. 2.

FIG. 2 is a flow chart showing a flow of operations of the handy terminal shown in FIG. 1. FIG. 3 is also a flow chart showing a flow of operations including install module preparation and registration of devices in Step S1 and Step S2 in FIG. 2. FIG. 4 is a flow chart showing a flow of operations of certifying the payment program in Step S6 of FIG. 2. By referring to these drawings, contents of processing for payment method to be used in the handy terminal of the embodiment.

The flows of operations of the main board 2 and the keyboard unit 3 are shown in FIG. 2. That is, as shown in FIG. 2, a module to be installed in the handy terminal 1 is prepared (Step S1) and the module is registered with a device of the handy terminal 1 (Step S2). When the registration of the module with the device of the handy terminal (install operation) is completed (Step S2), the processing of works at an ordinary operation is started (Step S3). By this, the keyboard unit 3 is operated as a generally used keyboard and inputting operation of the keyboard is performed by a user. Here, when the keyboard unit 3 detects the keyboard inputting and then informs the main board 2 of the inputting (Step S4), by the application program 11a of the main board memory 11, a key code is obtained from the keyboard inputting information of the keyboard unit 3 (Step S5).

Moreover, the keyboard unit 3 of the handy terminal 1 can also perform the inputting of the PIN code. At this point of time, in order to prevent the PIN code from being stolen by a malicious program, a certification process of the payment program 11b installed in the main board memory 11 on the main board 2 is performed (Step S6). The certification of the payment program 11b is performed every time the payment program is booted (that is, an EXE file is executed).

After the certification of the payment program 11b to be performed at Step 6 is completed, the insertion is detected by the card reader control program 23b installed in the keyboard unit memory 23 on the keyboard unit 3 (Step S7). From the result of comparison between a first hash value provided to the payment program 11b and a second hash value calculated at the time of execution of the payment program 11b, the payment program is judged to be legitimate, the inputting of a key code into the keyboard 22 is detected (Step S8). The detected key code is notified from the sub CPU 21 operating according to the keyboard control program 23a installed in the keyboard unit 3 to the main board 2. By this operation, the payment program 11b stored in the main board memory 11 on the main board 2 obtains a key code, that is, PIN code (Step S9). Moreover, when, by the result of the comparison of the hash values, the program is judged to be illegitimate, the keyboard unit 3 does not notify the inputting of a keyboard key code to the main board 2.

When the payment program 11b obtains a key code at Step S9, while a PIN code of a credit card is being inputted (Step 10), though the keyboard unit 3 continues the notification of the inputting of a key code to the payment program 11b (Step S8), the key code to be notified is "*code". Finally, when the extraction of a credit card is detected (Step S11), all the results from comparisons of hash values are cleared and the program returns back to the process by the general-use keyboard performed at Steps S4 and S5.

In the processes of the preparation of the install module and the registration of the device, in order to prevent the program hash value from being stolen, a program producer must prepare a public key to be distributed to general persons which is an asymmetric key in which a key to be used in encryption is separated from a key to be used in decryption (Step S21) and further prepares a secret key which its owner himself or herself knows (Step S22). Next, the payment program 11b stored in the main board memory 11 in the main board 2 is prepared (Step S23) and by using a developed PC (Personal Computer), a hash value provided by the main CPU 12 to the payment program 11b is calculated (Step S24). Moreover, the hash value is a value calculated according to a calculation method by which a random number of fixed length is produced from given data in the payment program 11b and, by utilizing the hash value, retrieving time of data can be shortened.

Next, for the prevention from stealing of the hash value, by using a secret key prepared by Step S22, the hash value calculated at Step S24 is encrypted (Step S25). Then, the encrypted hash value is coupled to the payment program 11b (Step S26) and the coupled module (i.e., encrypted hash vale and payment program 11b) is installed in the main board memory 11 of the main board 2 in the handy terminal 1 (Step S27).

The application program 11a to perform a process of work is also installed in the main board memory 11 on the main board 2 (Step S28). Moreover, the public key prepared at Step 21 in order to decrypt a hash value is installed in the keyboard unit memory 23 on the keyboard unit 3 (Step S29).

In the process of authenticating the payment program 11b at Step S6 in FIG. 2, as shown in FIG. 4, the hash value coupled at Step S26 in FIG. 3 is first separated from a coupled (encrypted) module to the payment program (Step S31) and the payment program 11b is left on the main board (Step S32) and an encrypted has value is transferred to the keyboard unit 3 (Step S33). Then, the sub CPU 21 in the keyboard unit 3 decrypts the hash value by using the registered public key (Step S34) to make the hash value be unencrypted (Step S35).

On the other hand, on the main board 2 side, the hash value is calculated by the main CPU 12 to be used at the time of execution of the payment program 11b left at Step 32 (Step S36). In order to prevent wiretapping between the main board 2 and the keyboard 22 in the keyboard unit 3, an encrypted key is produced by using a random number on the keyboard unit 3 side (Step S37) and the encrypted key is transferred to the main board 2. Then, on the main board 2 side, by using the encrypted key received from the keyboard unit 3, the hash value calculated by the main CPU 12 at Step S36 is encrypted (Step S38) and encrypted hash value is transferred to the keyboard unit 3 (Step S39).

By this operations, the sub CPU 21 in the keyboard unit 3 receives the encrypted hash value from the main board 2 (Step S40), and by using the encrypted key produced at Step S37, the encrypted hash value is decrypted and a resulting unencrypted hash value is taken out (Step S41). Further, the sub CPU 21 compares the first hash value provided to the payment program 11b calculated by the main CPU 12, by using a developed PC, at Step S24 in FIG. 3 with the second hash value calculated by the main CPU 12 at Step S36 in FIG. 4 at the time of the execution of the payment program (Step S42). If the comparison result shows that the first hash value is aligned with the second hash value, the payment program 11b is determined to be certified and the certification result is stored in the keyboard unit memory 23 on the keyboard unit 3 side (Step S43).

Moreover, the reason for encryption of a hash value is shown as the following reason (1) and (2):
(1) By confirming whether or not a logic for encryption of a hash value is legitimate, it can be judged whether the process on the main board 2 is legitimate.
(2) A serial interface portion between the main board 2 and the keyboard unit 3 is always monitored and, in order to prevent a hash value from being stolen and to prevent the hash value from being flown out, a hash value is encrypted by changing an encrypted key using a random number at every time of monitoring.

As described above, the handy terminal of the present invention is provided with a payment program legitimateness judging means to judge, when the insertion of a credit card is detected, whether the payment program demanded for inputting is released legitimately, by using the hash value of the payment program. When the payment program legitimateness judging means judges that the payment program is legitimate, a key code is notified thus enabling the inputting of a PIN, while the payment program legitimateness judging means judges that the payment program is illegitimate, the notification of the key code is denied thus disabling the inputting of the PIN. This enables the PIN code to be prevented from being read by a malicious third person.

The handy terminal of the present invention is made up of a detecting means to detect an insertion and extraction state of a credit card, a key code notification control means to control the key code notification while a credit card is being inserted or extracted, a hash value calculating means to calculate a program hash value to detect the alteration of the payment program, an encryption and decryption means to encrypt or decrypt a program hash value using a secrete key and encrypted key possessed by a program producer, a coupling means to couple an encrypted hash value to a payment program, and a hash value comparing means to compare a hash value provided to the program with the hash value obtained by calculating at the time of execution of a program.

The detection for detecting an insertion and extraction state of a credit card is realized by detecting the insertion of a credit card by the card reader control program 23b installed in the keyboard unit memory 23. Moreover, the key code notification control for controlling the key code notification in a state where the credit card is being inserted or extracted is realized by notification of a detected key code from the keyboard control program 23a in the keyboard unit 3 to the payment program 11b of the main board 2.

The hash value calculation to calculate a program hash value is realized by detecting the alteration of the payment program by calculating, using the main CPU 12, a hash value provided by the payment program 11b or the hash value obtained at the execution of the payment program 11b. Encryption and decryption of the program hash value by using a secret key, encrypted key, and public key possessed by a program producer's to prevent a program hash value from being stolen is achieved, by operations of the main CPU 12, and sub CPU 21, of encrypting and decrypting a hash value using the secret key, encrypted key, and public key.

The coupling of the encrypted hash value to the payment program is realized by coupling the encrypted hash value to the payment program to form a module and by installing the module in the main board memory 11 on the main board 2. Moreover, the hash value comparison to compare the hash value provided to a program with the hash value obtained by calculation at the time of execution of the program is realized by calculating, using the sub CPU 21, a first hash value provided to the payment program 11b and the second hash value obtained at the execution of the payment program 11b and by comparing these two values.

Thus, according to the present embodiment, the handy terminal, even when the inputting of an application program and of the PIN code is performed by a common keyboard 22, prior to operations of the inputting of a PIN code, judges whether the payment program is legitimately released. At this time, if the payment program, the inputting of which is required, is legitimate, the key code is notified and a Pin code can be inputted and if the payment program, the inputting of which is required, is illegitimate, the key code is not notified, which, as a result, enables the PIN code to be prevented from being stolen.

Thus, the embodiment is described by referring to the drawings and it is apparent that the present invention is not limited to the above embodiments and may b e changed and modified without departing from the scope and spirit of the present invention. For example, the handy terminal by which the inputting of application programs and the PIN code can be performed by a common keyboard is not limited to the payment process of a credit card and, when the handy terminal is used for electronic money, illegitimate use of the electronic money by a third person can be prevented.

The present invention claims the priority based on Japanese Patent Application laid-open No. 2009-256218, the entire contents of which are incorporated herein by reference in its entirety.

INDUSTRIAL APPLICABILITY

The handy terminal of the present invention, by alternately using solely the application program and PIN inputting, stealing of the PIN code can be prevented, without cooperation with a host processor such as a POS, the handy terminal can be effectively used at a retail store and/or a selling area and the like.

EXPLANATION OF LETTERS AND NUMERALS

1: Handy terminal,
2: Main board (Main CPU),
3: Keyboard unit (Sub CPU),
11: Main board memory (application program and payment program),
11a: application program,
11b: Payment program
12: Main CPU (corresponding to hash value calculating unit, and encryption unit recited in the claim(s)),
13: Display unit,
21: Sub CPU (corresponding to decryption unit, hash value comparison unit and PIN input control unit recited in the claim(s)),
22: Keyboard (shared keyboard),
23: Keyboard unit memory (corresponding to control unit recited in the claim(s)),
23a: Keyboard control program,
23b: card reader control program, 23c: PIN inputting control program (corresponding to control unit recited in the claim(s)),
24: Card reader.

What is claimed is:

1. A handy terminal comprising a main board and a keyboard unit connected to each other through an interface,
   the keyboard unit comprising:
   a shared keyboard for inputting data based on execution of an application program and inputting a PIN of a credit card based on execution of a payment program;
   a card reader to read information stored in the credit card;
   a sub CPU to control the shared keyboard and the card reader; and
   a keyboard unit memory configured to store control programs installed in the keyboard unit,
   the main board comprising:
   a main CPU (Central Processing Unit) to perform execution processing of the application program and the payment program each stored in the main board,
   wherein the main CPU is configured to calculate a first program hash value provided to the payment program, in response to installing the payment program on the main board, and to calculate a second program hash value every time the payment program is executed, wherein each program hash value is used to detect alteration of the payment program, and is a random number of fixed length produced from given data in the payment program by using a specified calculation method,
   wherein the main CPU is configured to encrypt the calculated first program hash value and the calculated second program hash value by using a first key, wherein the first key to encrypt the second program hash value is produced in the keyboard unit and is sent to the main board,
   wherein the sub CPU is configured to decrypt the encrypted first program hash value and the encrypted second program hash value by using a second key, wherein the second key to decrypt the first program hash value is only stored in the keyboard unit, and the second key to decrypt the second program hash value is produced in the keyboard unit,
   wherein the sub CPU is configured to compare the decrypted first program hash value and the decrypted second program hash value, and
   wherein a control program stored in the keyboard unit memory is executed to:
   notify the main board of an input of a key code into the shared keyboard and enable execution of inputting of the PIN of the credit card in response to determining that the first program hash value is aligned with the second program hash value based on a result from comparison by the sub CPU, and
   deny notification to the main board of the input of the key code into the shared keyboard and disable the execution of inputting of the PIN of the credit card in response to determining that the first program hash value is not aligned with the second program hash value based on the result from the comparison by the sub CPU.

2. The handy terminal according to claim 1, wherein the encrypted first program hash value and the payment program are coupled and installed, as a coupled module, on the main board.

3. The handy terminal according to claim 1, wherein the first key to encrypt the second program hash value and the second key to decrypt the second program hash value are produced in the keyboard unit, every time the payment program is executed.

4. The handy terminal according to claim 2, wherein the first key to encrypt the second program hash value and the second key to decrypt the second program hash value are produced in the keyboard unit, every time the payment program is executed.

5. The handy terminal according to claim 1,
   wherein the first key is a secret key or an encryption key produced by using a random number and that the second key is a public key or the encryption key.

6. The handy terminal according to claim 2,
   wherein the first key is a secret key or an encryption key produced by using a random number and that the second key is a public key or the encryption key.

7. The handy terminal according to claim 3,
   wherein the first key is a secret key or an encryption key produced by using a random number and that the second key is a public key or the encryption key.

8. The handy terminal according to claim 1, wherein the second key to decrypt the second program hash value and the first key to encrypt the second program hash value are a same encryption key produced by using a random number.

9. The handy terminal according to claim 2, wherein the second key to decrypt the second program hash value and the first key to encrypt the second program hash value are a same encryption key produced by using a random number.

10. The handy terminal according to claim 3, wherein the second key to decrypt the second program hash value and the first key to encrypt the second program hash value are a same encryption key produced by using a random number.

11. A payment method to be used in a handy terminal including a main board and a keyboard unit connected to each other through an interface, the main board comprising a main CPU (Central Processing Unit) to perform execution processing of an application program and a payment program each stored in the main board, and the keyboard unit comprising a shared keyboard for inputting data based on execution of the application program and inputting a PIN of a credit card based on execution of the payment program; a card reader to read information stored in the credit card; a sub CPU to control the shared keyboard and the card reader; and a keyboard unit memory configured to store control programs installed in the keyboard unit, the payment method comprising:
   a calculating step, by the main CPU, of calculating a first program hash value provided to the payment program, in response to installing the payment program on the main board, and calculating a second program hash value every time the payment program is executed, wherein each program hash value is used to detect alteration of the payment program, and is a random number of fixed length produced from given data in the payment program by using a specified calculation method,
   an encrypting step, by the main CPU, of encrypting the calculated first program hash value and the calculated second program hash value by using a first key, wherein the first key to encrypt the second program hash value is produced in the keyboard unit and is sent to the main board,
   a decrypting step, by the sub CPU, of decrypting the encrypted first program hash value and the encrypted second program hash value by using a second key, wherein the second key to decrypt the first program hash value is only stored in the keyboard unit, and the second key to decrypt the second program hash value is produced in the keyboard unit,
a comparing step, by the sub CPU, of comparing the decrypted first program hash value and the decrypted second program hash value, and
a controlling step, by a control program stored in the keyboard unit memory and executed, of notifying the main board of an input of a key code into the shared keyboard and enabling execution of inputting of the PIN of the credit card in response to determining that the first program hash value is aligned with the second program hash value based on a result from comparison by the sub CPU, and denying notification to the main board of the input of the key code into the shared keyboard and disabling the execution of inputting of the PIN of the credit card in response to determining that the first program hash value is not aligned with the second program hash value based on the result from the comparison by the sub CPU.

12. The payment method according to claim 11, wherein the encrypted first program hash value and the payment program are coupled and installed, as a coupled module, on the main board.

13. The payment method according to claim 11, wherein the first key to encrypt the second program hash value and the second key to decrypt the second program hash value are produced in the keyboard unit, every time the payment program is executed.

14. The payment method according to claim 12, wherein the first key to encrypt the second program hash value and the second key to decrypt the second program hash value are produced in the keyboard unit, every time the payment program is executed.

15. The payment method according to claim 11, wherein the first key is a secret key or an encrypted key produced by using a random number, and
that the second key is a public key or the encrypted key.

16. The payment method according to claim 12, wherein the first key is a secret key or an encrypted key produced by using a random number, and
that the second key is a public key or the encrypted key.

17. The payment method according to claim 13, wherein the first key is a secret key or an encrypted key produced by using a random number, and
that the second key is a public key or the encrypted key.

18. The payment method according to claim 11, wherein the second key to decrypt the second program hash value and the first key to encrypt the second program hash value are a same encryption key produced by using a random number.

19. The payment method according to claim 12, wherein the second key to decrypt the second program hash value and the first key to encrypt the second program hash value are a same encryption key produced by using a random number.

20. The payment method according to claim 13, wherein the second key to decrypt the second program hash value and the first key to encrypt the second program hash value are a same encryption key produced by using a random number.

* * * * *

UNITED STATES PATENT AND TRADEMARK OFFICE
CERTIFICATE OF CORRECTION

PATENT NO. : 10,491,395 B2
APPLICATION NO. : 13/496159
DATED : November 26, 2019
INVENTOR(S) : Tsuyoshi Komiyama Page 1 of 1

It is certified that error appears in the above-identified patent and that said Letters Patent is hereby corrected as shown below:

In the Specification

Column 5, Line 64; Before "key", delete "keyboard"

Signed and Sealed this
Twenty-fourth Day of November, 2020

Andrei Iancu
*Director of the United States Patent and Trademark Office*